United States Patent

Hicks et al.

[11] Patent Number: 5,840,243
[45] Date of Patent: Nov. 24, 1998

[54] METHOD OF FORMING BLISTER PACK PACKAGING

[75] Inventors: Robert L. Hicks; Lawrence H. Luebbert; Gary L. Konop, all of Iowa City, Iowa

[73] Assignee: Gillette Canada Inc., Kirkland, Canada

[21] Appl. No.: 664,353

[22] Filed: Jun. 17, 1996

[51] Int. Cl.⁶ ................................................. B29C 51/42
[52] U.S. Cl. ..................... 264/509; 264/522; 264/132; 425/384
[58] Field of Search ...................... 264/522, 550, 264/509, 132; 425/384; 53/559, 560, 453, 454

[56] References Cited

U.S. PATENT DOCUMENTS

| | | | |
|---|---|---|---|
| Re. 29,937 | 3/1979 | Mahaffy et al. | 53/559 |
| 2,985,915 | 5/1961 | Winstead | 264/522 |
| 3,195,284 | 7/1965 | Crane, Jr. . | |
| 3,198,681 | 8/1965 | Watts, Jr. . | |
| 3,294,301 | 12/1966 | Richter . | |
| 3,400,811 | 9/1968 | Panicci . | |
| 3,492,773 | 2/1970 | Bergstrom . | |
| 3,496,610 | 2/1970 | Shelby et al. | 425/384 |
| 3,577,700 | 5/1971 | Bensheim et al. . | |
| 3,632,252 | 1/1972 | Amberg | 425/388 |
| 3,929,952 | 12/1975 | Edwards | 264/521 |
| 4,033,092 | 7/1977 | Vetter . | |
| 4,048,781 | 9/1977 | Johansen | 264/322 |
| 4,068,448 | 1/1978 | Modeen . | |
| 4,165,594 | 8/1979 | Corbic . | |
| 4,349,999 | 9/1982 | Mahaffy et al. | 53/559 |
| 4,381,279 | 4/1983 | Jakobsen et al. | 264/522 |
| 4,381,637 | 5/1983 | Ballestrazzi et al. . | |
| 4,420,454 | 12/1983 | Kawaguchi et al. . | |
| 4,559,755 | 12/1985 | Romangnoli . | |
| 4,565,052 | 1/1986 | Hautemont . | |
| 4,595,554 | 6/1986 | Bullock et al. | 264/522 |
| 4,842,742 | 6/1989 | Plante | 264/522 |
| 4,996,824 | 3/1991 | Torterotot . | |
| 5,404,693 | 4/1995 | Giovannone . | |
| 5,545,370 | 8/1996 | Moren et al. . | |
| 5,633,022 | 5/1997 | Myers | 264/509 |

FOREIGN PATENT DOCUMENTS

| | | |
|---|---|---|
| 61-172722 | 8/1986 | Japan . |
| 06131228 | 5/1994 | Japan . |
| 1 416 818 | 12/1975 | United Kingdom . |
| 2 052 365 | 1/1981 | United Kingdom . |

OTHER PUBLICATIONS

PCT Search Report.

*Primary Examiner*—Catherine Timm
*Attorney, Agent, or Firm*—Fish & Richardson P.C.

[57] ABSTRACT

A method of forming blister pack packaging is provided including providing a thermoplastic material and placing the thermoplastic material between a pair of opposed male and female thermoforming dies, while cooling a portion of at least one of the dies. The cooled portion of the die is positioned to contact the area of the thermoplastic material in which it is desired to avoid distortion.

10 Claims, 3 Drawing Sheets

METHOD OF FORMING BLISTER PACK PACKAGING

BACKGROUND OF THE INVENTION

The present invention relates to methods of forming blister pack packaging.

Articles to be displayed for retail sale are frequently packaged in "blister pack" packaging. A blister pack includes a flat backing sheet, generally of cardboard or plastic, and a plastic "bubble" or "blister", generally of transparent plastic, the backing sheet and blister being joined to form a sealed cavity in which the article rests.

The blister portion of the packaging may be formed by thermoforming a region of a planar plastic material to a desired shape, e.g., by placing the plastic material between a pair of male and female dies that are temperature controlled at a temperature sufficient to soften the plastic and pressing the male and female dies together to form an indentation or "blister" in the plastic.

This process for forming the blister portion is generally effective, but tends to create distortion of the plastic which can be undesirable. In particular, because of this distortion, it is often difficult or impossible to use a plastic material having a decorative graphic pre-printed on it, as the graphic will also be distorted. As a result, any desired graphics are typically applied in a separate processing step, e.g., by applying a decal and/or label to the thermoformed plastic.

SUMMARY OF THE INVENTION

In one aspect, the invention features an improved method of forming blister pack packaging. Advantageously, the method of the invention allows a blister pack to be thermoformed using preprinted plastic material without undesirable deformation of the plastic material and thus the printing on the plastic. The method of the invention may also allow decals or labels to be applied to a printed or non-printed plastic material prior to thermoforming, without risk of damage to the decal or label during the thermoforming process. The method of the invention also provides excellent control over the wall thickness of the thermoformed blister.

The method of the invention includes providing a substantially planar thermoplastic material and placing the thermoplastic material between a pair of opposed male and female thermoforming dies, while cooling a portion of at least one of the dies. The cooled portion of the die is positioned to contact the area of the thermoplastic material in which it is desired to avoid distortion. By "cooling", it is meant that the temperature of the die is reduced relative to its normal operating temperature; because the normal operating temperature of the die may be significantly higher than room temperature, due to friction, "cooling" is meant to include reducing the temperature of the die to a temperature higher than room temperature but lower than the temperature that the die would be at were it not cooled.

Preferred embodiments include one or more of the following features. A portion of the male die is cooled and the female die is temperature controlled to maintain the female die at a sufficient temperature to allow the plastic material used to be thermoformed. The male die includes (a) a metal head that has a bore for the passage of water to cool the metal head, and (b) insulating sidewalls on each side of the metal head. The thermoplastic material is preheated prior to being placed between the dies. The female die is a vacuum forming die.

In another aspect, the invention features a thermoforming system for forming blister pack packaging, including opposed male and female dies, one of which includes a cooled portion. Preferably a portion of the male die is cooled, as described above.

Other features and advantages of the invention will be apparent from the description of preferred embodiments thereof, taken together with the drawings, and from the claims.

DESCRIPTION OF THE PREFERRED EMBODIMENTS

Figure 1:
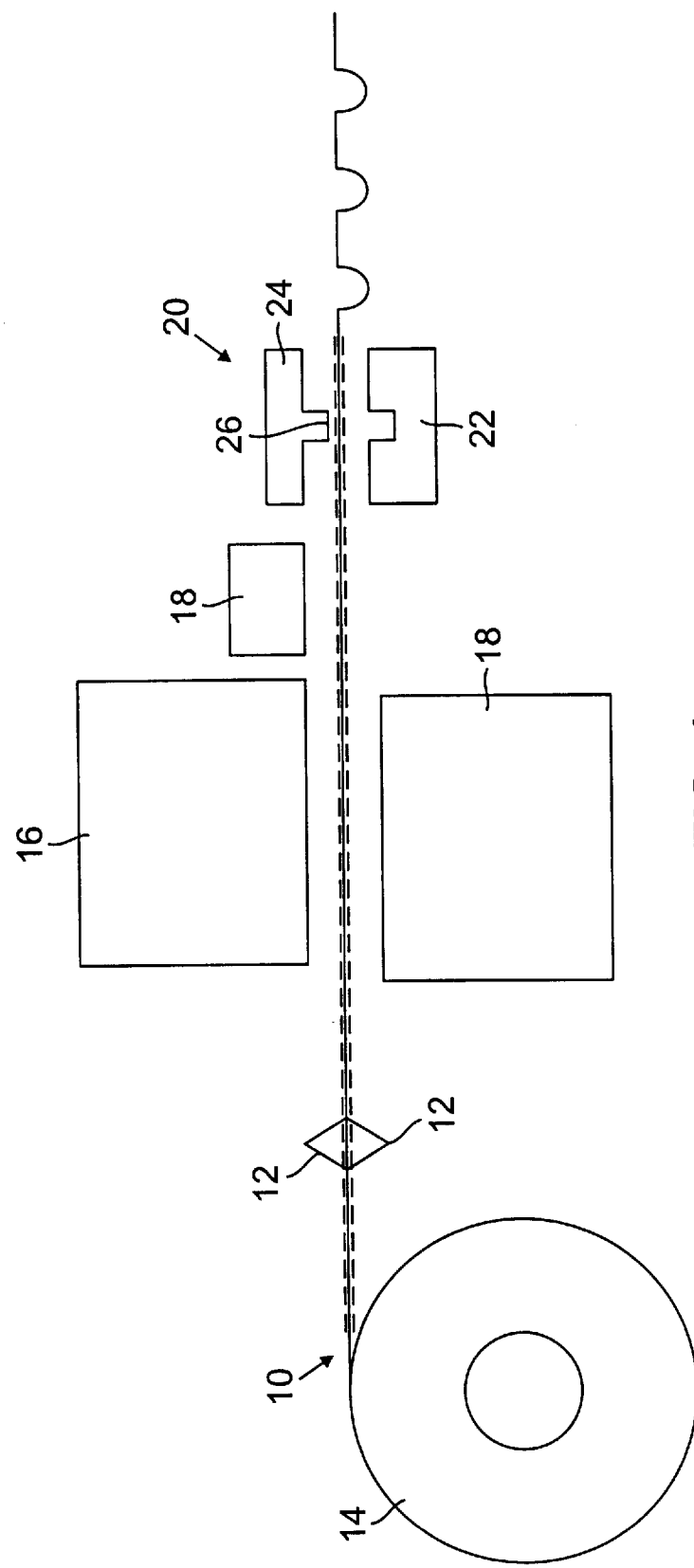
FIG. 1 is schematic perspective view of a production line utilizing a method according to one embodiment of the invention.

A preferred method according to the invention is shown in FIG. 1. According to this method, a planar plastic material 10 having a plurality of graphics 12 (preprinted, labels or decals) spaced at intervals on its surface, is unrolled from a roll 14. The plastic is first preheated by any desired heating device 16, as is well known in the vacuum forming art. The preheating temperature will depend upon the plastic used, as would be understood by those skilled in the art, but will generally be from about 175° C. to 230° C. Next, the plastic is passed through a registration device 18, which may be any desired type of registration device, e.g., optical or mechanical, for registration of the spacing of the graphics 12. The plastic passes next to the vacuum forming station 20.

The vacuum forming station 20 includes a heated female thermoforming cavity 22 and a chilled male thermoforming die 24. The female cavity 22 is preferably temperature controlled to maintain its temperature constant at about 20° to 80° C., depending upon the plastic used, as would be understood by one skilled in the art. The male die is chilled to a predetermined temperature, e.g., from about −10° C. to 30° C., generally about 4° C. to 25° C., to prevent distortion of the plastic during thermoforming. The temperature selected will depend upon the plastic used; for example, a suitable temperature for polyvinyl chloride (PVC) is 15° C. Suitable temperatures for other plastics could be readily determined by one skilled in the art by trial and error; a suitable temperature is one at which little or no distortion of a preprinted graphic is observed. It is preferred that the male die contact the plastic first, prior to the plastic contacting the female cavity, for optimum control of plastic distortion.

Preferably, only the tip portion 26 of the male die is chilled, so as not to interfere with thermoforming of the plastic by the sidewalls of the male die. Depending upon the location of the graphic 12 on the blister, different areas of the die may be chilled. However, in most cases at least a portion of the die should not be chilled, to ensure proper thermoforming.

Figure 2:
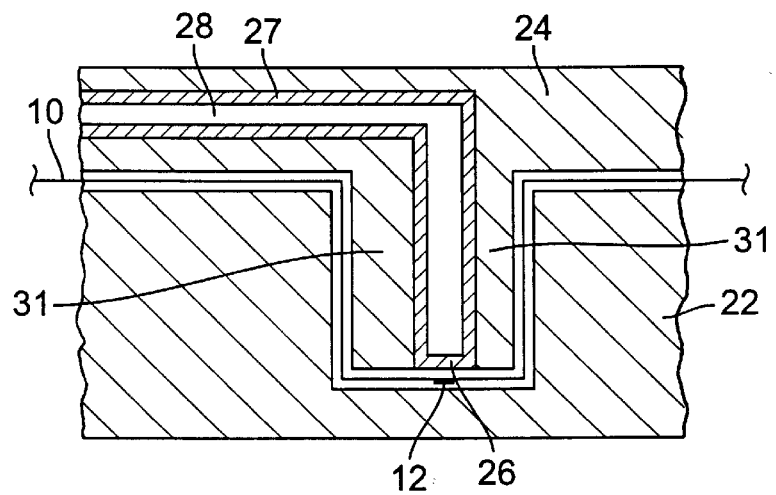
FIGS. 2 and 2a are cross-sectional views, taken along lines 2—2 and 2A—2A, respectively, of the thermoforming die used in the production line shown in FIG. 1.
Figure 2A:
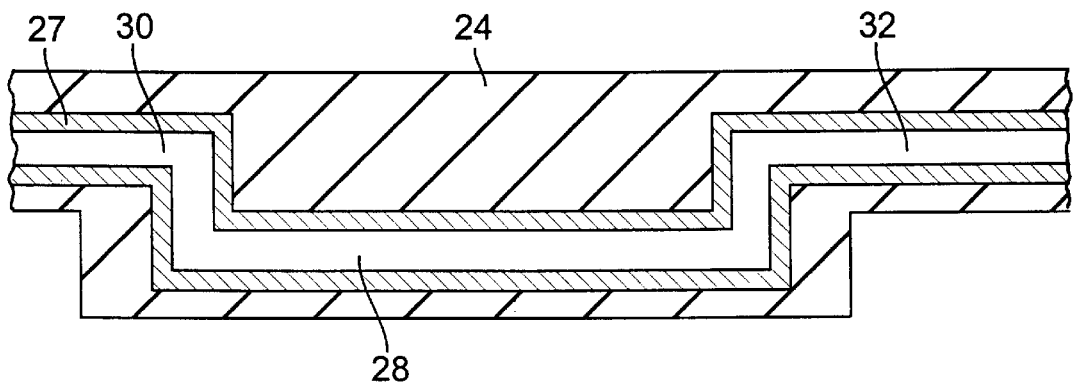

Chilling of the tip portion of the male die may be accomplished by providing a male die as shown in FIGS. 2 and 2a. Male die 24 includes a core 27 having a cooling channel 28 extending along its length, the cooling channel having an inlet 30 and an outlet 32 and being positioned adjacent the tip portion 26 of the die. Cooling channel 28 allows cold water or other chilled fluid to be channeled through the die continuously during the thermoforming process. Suitable channel diameters are those which are sufficiently small to fit within a desired width die, yet sufficiently large to provide a desired degree of cooling with the fluid used, as would be understood by one skilled in the art. In the embodiment shown, the diameter of the channel is preferably from about 3 to 4 mm.

Preferably, the core 27 is formed of metal or other highly thermally conductive material, for most effective cooling. The remainder of the male die (the sidewalls 31 of the die) is preferably constructed of a thermally insulative material, e.g., insulating laminates such as those commercially available from McMaster-Carr, Chicago, Ill., under the tradenames GAROLITE and YOROLITE, or syntactic composites, e.g., those available from Emerson & Cuming, Canton, Mass., under the tradename SYNTAC® 350. Preferred insulating materials have a thermal conductivity of from about 0.1 to 0.2 W/(m×K).

Figure 3:
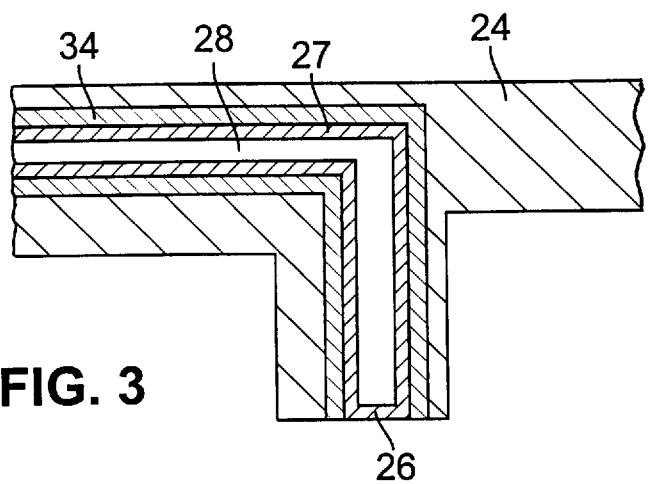
FIG. 3 is a cross-sectional view of a male die according to an alternate embodiment of the invention, taken along line 2—2 of FIG. 1.

If the side walls of the male die are too cold for a given application, an alternative die can be used, as shown in FIG. 3, in which a further insulating layer 34 is provided between the core 27 and the sidewalls 31. Insulating layer 34 may be any desired insulative material, e.g., a fiberglass sheet material such as that available under the tradename YOROLITE, from McMaster-Carr.

Other embodiments are within the claims. For example, any desired cooling method can be used to cool a portion of the die, e.g., a refrigeration loop, as would be understood by one skilled in the art. Moreover, other fluids can be used to cool the die, rather than water, e.g., glycols, for example, ethylene glycol, or compressed air.

Figure 4:
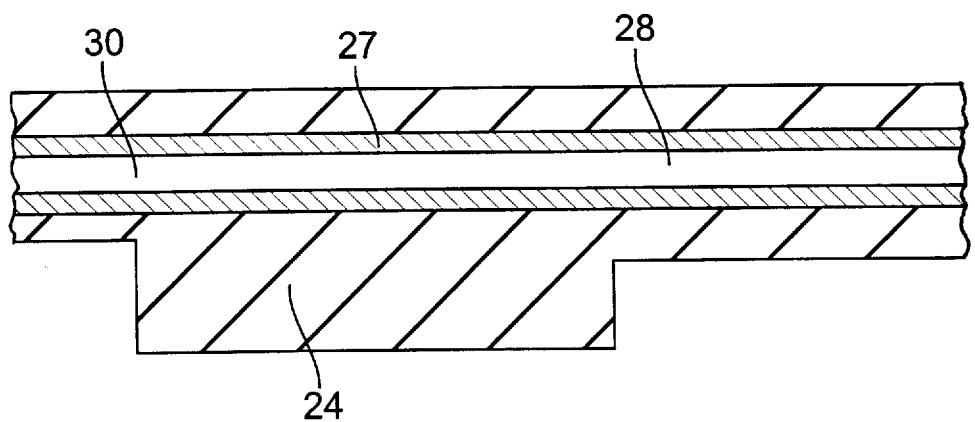
FIG. 4 is a cross-sectional view of a male die according to yet another alternate embodiment of the invention, taken along line 2A—2A in FIG. 1.

Further, as shown in FIG. 4, cooling channel 28 can run directly from the inlet to the outlet, without extending downward towards the tip of the die as shown in FIG. 2A. The die shown in FIG. 4 is more economical to manufacture, and thus may be advantageous if the die materials are selected to allow sufficient cooling of the tip to be obtained with this configuration of the cooling channel.

We claim:

1. A method of forming blister pack packaging, the method comprising placing a substantially planar thermoplastic material, the material having an area with a preprinted graphic, between a pair of opposed male and female thermoforming dies, the male die having a cooled portion arranged to contact the preprinted area of the thermoplastic material to prevent undesirable distortion of the graphic; and contacting the preprinted area with the cooled portion of the male die while thermoforming the thermoplastic material against the female die to form a blister the preprinted area cooled by the cooled portion of the male die to a level preventing distortion of the graphic during thermoforming.

2. A method of forming blister pack packaging comprising:

providing a substantially planar thermoplastic material having a preapplied graphic on an area of said thermoplastic material and, placing a portion of the thermoplastic material between a pair of opposed male and female thermoforming dies, while cooling a portion of the male die; and contacting said area of the thermoplastic material having said preapplied graphic thereon, in which it is desired to avoid distortion, with the cold portion of the male die, thereby cooling said area sufficiently to prevent distortion of said while thermoforming said material against a surface of the female die to form blister pack packaging.

3. The method of claim 2 wherein said cooled portion is cooled to a temperature between about −10° and 30° C.

4. The method of claim 3 wherein said cooled portion is cooled to a temperature between about 4° and 25° C.

5. The method of claim 2 wherein the female die is temperature controlled at a predetermined temperature sufficient to allow thermoforming of the thermoplastic.

6. The method of claim 2 wherein the male die includes (a) a metal head that has a bore for the passage of a cooling fluid to cool the metal head, and (b) insulating sidewalls on each side of the metal head.

7. The method of claim 6 wherein said cooling fluid is water.

8. The method of claim 6 wherein said cooling fluid is a glycol.

9. The method of claim 2 wherein the thermoplastic material is preheated prior to being placed between the dies.

10. The method of claim 2 wherein the female die defines a vacuum forming cavity.

\* \* \* \* \*